United States Patent [19]

Berman et al.

[11] Patent Number: 5,613,302
[45] Date of Patent: Mar. 25, 1997

[54] CIRCUMFERENTIAL WAIST MEASURING DEVICE

[76] Inventors: Paul Berman, 1650 Tenth St., Santa Monica, Calif. 90404; Steve Love, 1000 Covewood Ct., Charlotte, N.C. 28270

[21] Appl. No.: 520,661
[22] Filed: Aug. 22, 1995
[51] Int. Cl.⁶ .................................................. G01B 5/08
[52] U.S. Cl. ........................................ 33/514.2; 33/555.4
[58] Field of Search ...................... 33/512, 514.1, 33/514.2, 555.4, 555.2, 555.1, 511

[56] References Cited

U.S. PATENT DOCUMENTS

| 492,566 | 2/1893 | Wichelmann | 33/514.1 |
| 650,389 | 5/1900 | Hatfield | 33/555.4 |
| 1,096,206 | 5/1914 | Thomas | 33/514.2 |
| 1,978,682 | 10/1934 | Marvin | 33/555.4 |
| 2,129,582 | 9/1938 | Johansson | 33/555.4 |
| 2,271,725 | 2/1942 | Tunnicliff | 33/514.2 |
| 2,636,281 | 4/1953 | Unger | 33/514.2 |
| 3,744,140 | 7/1973 | Kryk | 33/555.4 |
| 5,067,246 | 11/1991 | Hesske et al. | 33/555.4 |

FOREIGN PATENT DOCUMENTS

| 539551 | 7/1959 | Belgium | 33/555.4 |
| 1084470 | 1/1955 | France | 33/555.4 |
| 427497 | 10/1948 | Italy | 33/555.4 |
| 1744419 | 6/1992 | U.S.S.R. | 33/555.4 |

Primary Examiner—Thomas B. Will

[57] ABSTRACT

A device for measuring a waist of an individual. The inventive device includes a main body having a measuring loop coupled to a first end thereof. A portion of the measuring loop is biased into the main body by a spring for storage to preclude unintentional engagement with surrounding objects and includes an indicator projecting from the main body such that a waist of a child can be measured to select an appropriate diaper size within a store. The device can additionally be utilized for simply estimating a circumference of a portion or waist of a human body absent an actual positioning of the portion of the human body thereinto.

1 Claim, 3 Drawing Sheets

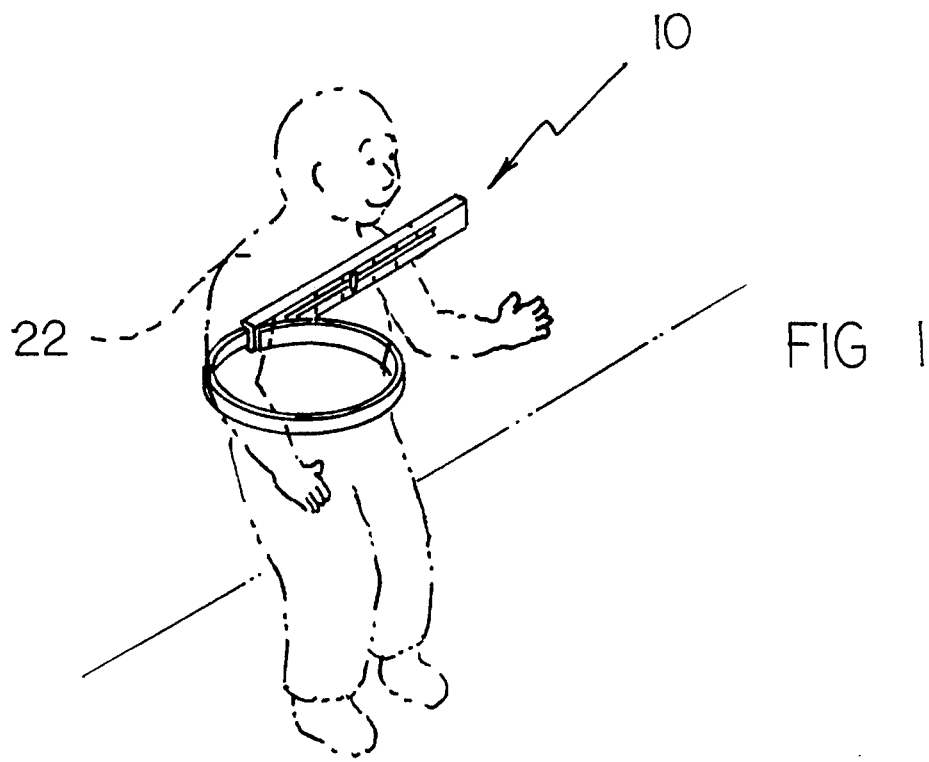
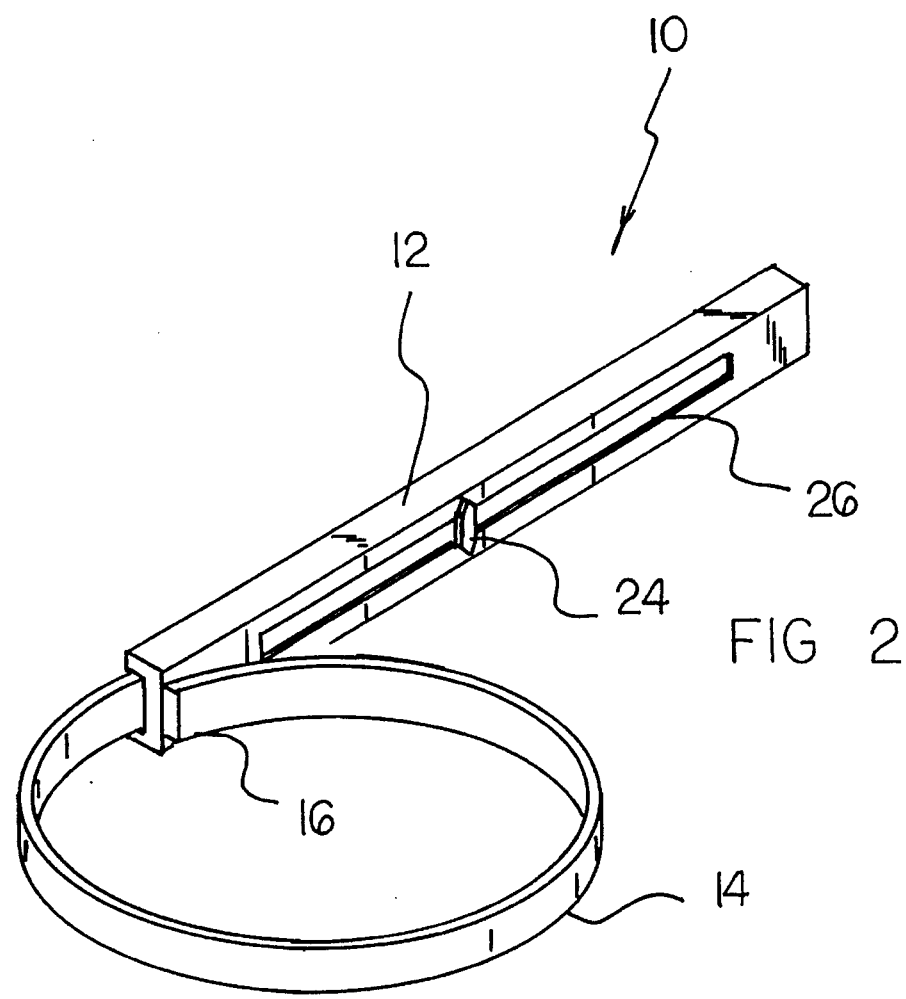

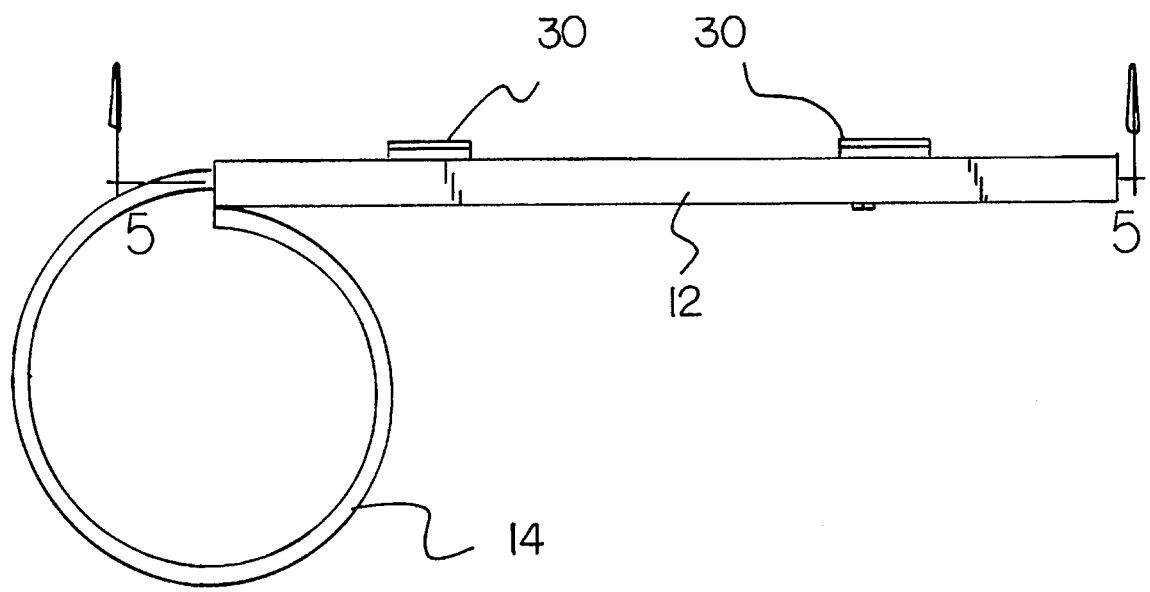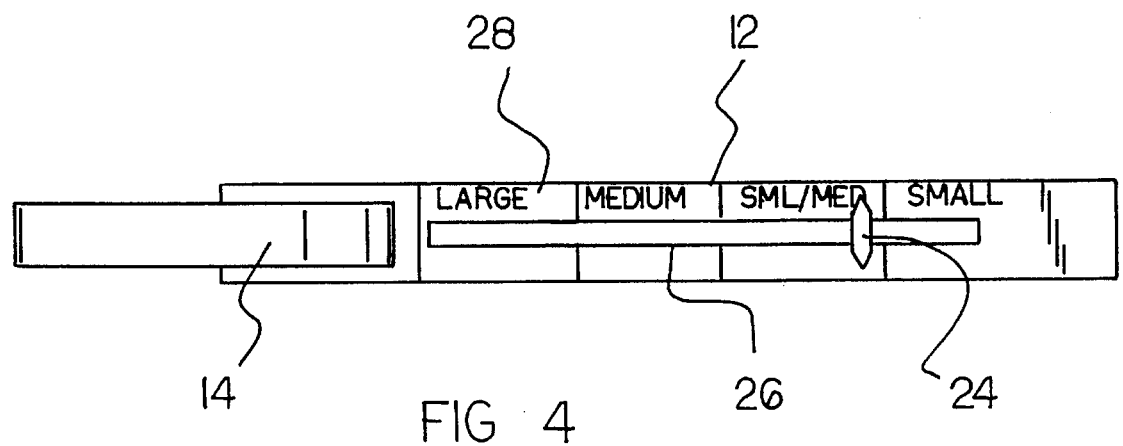

CIRCUMFERENTIAL WAIST MEASURING DEVICE

BACKGROUND OF THE INVENTION

1. Field of the Invention

The present invention relates to measuring structures and more particularly pertains to a circumferential waist measuring device for measuring a waist of an individual.

2. Description of the Prior Art

Known prior art measuring structures include U.S. Pat. Nos. 5,269,069; 5,193,287; 4,920,659; 1,814,401; 1,216,672; and 1,096,206.

While these devices fulfill their respective, particular objectives and requirements, the aforementioned patents do not disclose a circumferential waist measuring device for measuring a waist of an individual which includes a main body having a measuring loop coupled to a first end thereof, with a portion of the measuring loop being biased into the main body by a spring and including a indicator projecting from the main body such that a waist of a child can be measured to select an appropriate diaper size within a store.

In these respects, the circumferential waist measuring device according to the present invention substantially departs from the conventional concepts and designs of the prior art, and in so doing provides an apparatus primarily developed for the purpose of measuring a waist of an individual.

SUMMARY OF THE INVENTION

In view of the foregoing disadvantages inherent in the known types of measuring structures now present in the prior art, the present invention provides a new circumferential waist measuring device construction wherein the same can be utilized for measuring the waist of individual. As such, the general purpose of the present invention, which will be described subsequently in greater detail, is to provide a new circumferential waist measuring device apparatus and method which has many of the advantages of the measuring structures mentioned heretofore and many novel features that result in a circumferential waist measuring device which is not anticipated, rendered obvious, suggested, or even implied by any of the prior art measuring structures, either alone or in any combination thereof.

To attain this, the present invention generally comprises a device for measuring a waist of an individual. The inventive device includes a main body having a measuring loop coupled to a first end thereof. A portion of the measuring loop is biased into the main body by a spring and includes an indicator projecting from the main body such that a waist of a child can be measured to select an appropriate diaper size within a store.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is another object of the present invention to provide a new circumferential waist measuring device which may be easily and efficiently manufactured and marketed.

It is a further object of the present invention to provide a new circumferential waist measuring device which is of a durable and reliable construction.

An even further object of the present invention is to provide a new circumferential waist measuring device which is susceptible of a low cost of manufacture with regard to both materials and labor, and which accordingly is then susceptible of low prices of sale to the consuming public, thereby making such circumferential waist measuring devices economically available to the buying public.

Still another object of the present invention is to provide a new circumferential waist measuring device for measuring a waist of an individual.

Yet another object of the present invention is to provide a new circumferential waist measuring device which includes a main body having a measuring loop coupled to a first end thereof, with a portion of the measuring loop being biased into the main body by a spring and including a indicator projecting from the main body such that a waist of a child can be measured to select an appropriate diaper size within a store.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an isometric illustration of a circumferential waist measuring device according to the present invention in use.

FIG. 2 is an isometric illustration of the invention, per se.

FIG. 3 is a top plan view thereof.

FIG. 4 is a front elevation view of the invention.

DESCRIPTION OF THE PREFERRED EMBODIMENT

Figure 5:
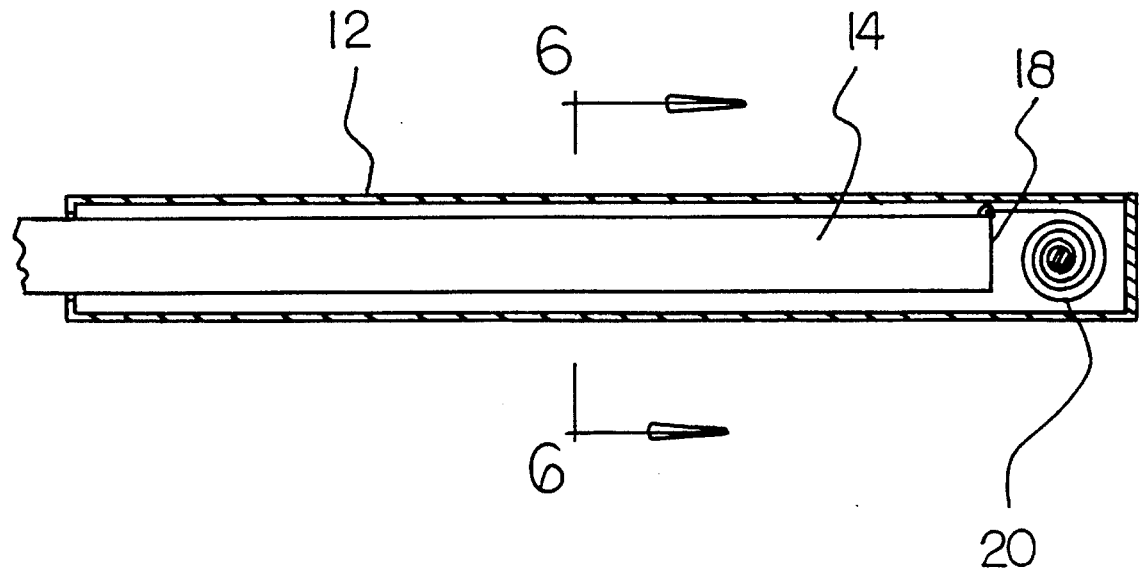
FIG. 5 is a cross sectional view taken along line 5—5 of FIG. 3.

With reference now to the drawings, and in particular to FIGS. 1–6 thereof, a new circumferential waist measuring device embodying the principles and concepts of the present invention and generally designated by the reference numeral 10 will be described.

More specifically, it will be noted that the circumferential waist measuring device 10 comprises an elongated main body 12 securable to a supporting surface such as a shelf, a vertical wall, or the like within a store substantially as shown in FIG. 1 of the drawings. A measuring loop 14 is coupled at a first end thereof 16 to a portion of the main body 12. The measuring loop 14 extends into a substantially annular configuration, with a second end 18 of the measuring loop 14 projecting into the main body 12. A spring 20 mounted within the main body 12 is coupled to the second end 18 of the measuring loop 14 so as to bias the second end into the main body 12 to constrict the measuring loop 14 about a waist of an individual such as an infant 22 substantially as shown in FIG. 1 of the drawings. An indicator 24 projects from a portion of the measuring loop 14 and can be interpreted relative to the main body 12 so as to indicate an approximate size or circumference of the waist of the infant 22. By this structure, an individual within a store or like facility can selectively and approximately measure a circumferential distance about a waist of an infant 22 to permit an informed selection of an appropriate size of diaper or like garment.

Referring now to FIGS. 2 through 6 wherein the present invention 10 is illustrated in detail, it can be shown that the main body 12 is shaped so as to define an elongated slot 26 directed through a front face thereof. The elongated slot 26 is oriented so as to extend along a portion of a longitudinal length of the main body 12, with the indicator 24 projecting through the elongated slot 26 substantially as shown in FIG. 4 of the drawings. Scale indicia 28 is printed on the front face of the main body 12 and can include relative terms as "SMALL", "MEDIUM", and "LARGE" which serve to correspond to available sizes of a particular garment such as an unillustrated diaper or the like. By this structure, an individual can obtain an approximate indication of size for a diaper or the like to be selected for a particular infant 22.

Figure 6:
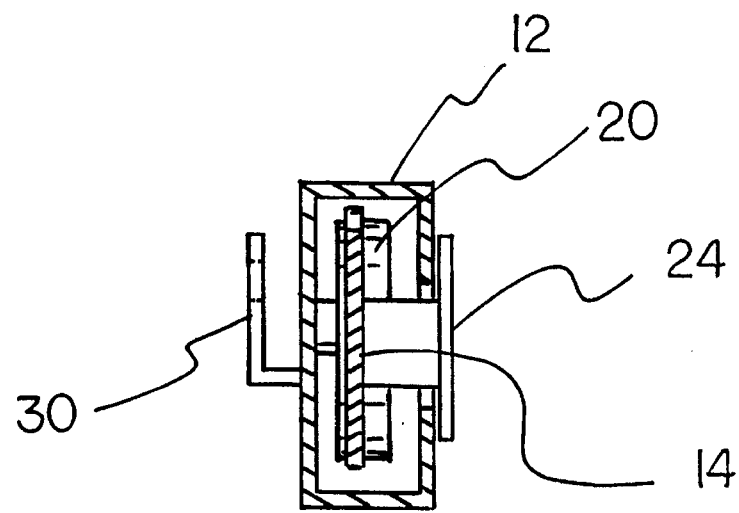
FIG. 6 is a cross sectional view taken along line 6—6 of FIG. 5.

Referring now to FIGS. 5 and 6, it can be shown that the spring 20 of the present invention 10 preferably comprises a spiral spring wound about an unlabeled post fixedly secured to an interior of the main body 12. The spiral spring 20 thus extends from the unlabeled post to couple with the second end 18 of the measuring loop 14. By this structure, the second end 18 of the measuring loop 14 is continuously biased into the housing 12 so as to constrict an exterior portion of the measuring loop 14 about a waist of an individual substantially as shown in FIG. 1 of the drawings. The indicator 24 is adhesively or otherwise fixedly secured to the measuring loop 14 and projects through the elongated slot 26 in the main body 12 as illustrated in FIG. 6. Thus, the indicator 24 can also be utilized to bias the second end 18 of the measuring loop 14 against a force of the spiral spring 20 so as to permit insertion of the infant 22 or like individual into the measuring loop 14.

As shown in FIG. 3, the present invention preferably includes at least one mounting bracket 30 secured to a rear surface of the main body 12 which permits securement of the invention 10 to a supporting surface such as a shelf within a grocery store or the like. The mounting bracket 30 is preferably substantially L-shaped and includes an unlabeled threaded aperture extending therethrough permitting the passage of a securing fastener such as a screw or a bolt through the mounting bracket 30 for subsequent engagement with a portion of the unillustrated supporting structure to couple the device 10 relative thereto.

In use, the circumferential waist measuring device 10 of the present invention can be easily utilized for measuring a waist of an individual such as the infant 22 illustrated in FIG. 1 of the drawings. The present invention 10 is not meant to be limited to use with infants, but rather may also be configured for use with adults in the selection of pants or other garments.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A circumferential waist measuring device comprising:

an elongated main body having a hollow interior and being securable to a supporting surface, the main body being shaped so as to define an elongated slot directed through a front face thereof, the elongated slot being oriented so as to extend along a portion of a longitudinal length of the main body, size indicia relating to waist size and circumference measurements for an individual being printed on the front face of the main body;

a measuring loop coupled at a first end thereof to a portion of the main body, the measuring loop extending into a substantially annular configuration, with a second end of the measuring loop projecting into the main body; a spring mounted within the main body and coupled to the second end of the measuring loop so as to bias the second end into the main body;

a post mounted within the main body, the spring comprising a spiral spring wound about the post, the spiral spring extending from the post to couple with the second end of the measuring loop;

an indicator projecting through the elongated slot and from a portion of the measuring loop which can be interpreted relative to the size indicia on the main body so as to indicate an approximate size and circumference of a waist of an individual around which the measuring loop is located; and at least one mounting bracket secured to a rear surface of the main body which permits securement of the device to a supporting structure, the mounting bracket being substantially L-shaped and including a threaded aperture extending therethrough permitting the passage of a threaded securing fastener through the mounting bracket for subsequent engagement with a portion of a supporting structure.

\* \* \* \* \*